Aug. 11, 1931.   G. D. TURNBOW   1,818,364
METHOD OF PREPARING ICE CREAM
Filed Nov. 13, 1926
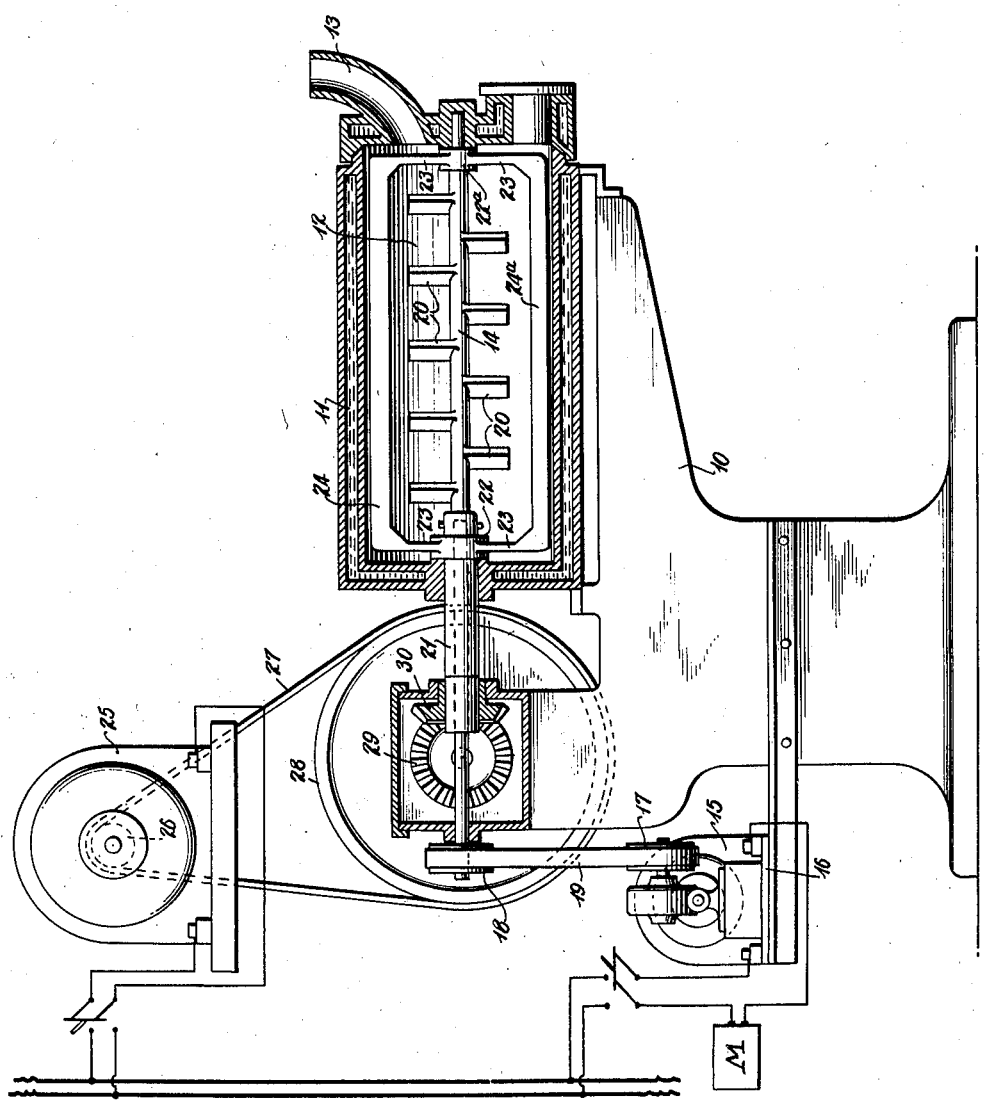
INVENTOR.
Grover D. Turnbow
BY
his ATTORNEYS Patented Aug. 11, 1931

1,818,364

UNITED STATES PATENT OFFICE

GROVER D. TURNBOW, OF DAVIS, CALIFORNIA, ASSIGNOR OF ONE-HALF TO CHESTER EARL GRAY, OF OAKLAND, CALIFORNIA

METHOD OF PREPARING ICE CREAM

Application filed November 13, 1926. Serial No. 148,283.

This invention relates to improved methods of preparing frozen food products, and particularly the preparation of ice cream.

In the preparation of frozen food products, such as ice cream, it is of especial importance that a certain amount of air or other gases be incorporated in the finished product. Efforts have been made to incorporate carbon dioxide and other gases instead of air, but such efforts have met with more or less indifferent success, and as a result the incorporation of air in the product is the usual procedure. However, whether air or gas is used, and the nature of the gas, if a gas is used, is immaterial insofar as the present invention is concerned. This incorporation of air or gas in a product such as ice cream is necessary to give it the desired characteristics, such as texture, and it therefore follows that the most desirable characteristics and quality are obtained in the final product when there is a certain relation between the air or gas content and the other ingredients constituting the ice cream. Much study has been given to the regulation and control of the air content in the finished product, but the results obtained have not been successful to any great extent.

Practically in all forms of apparatus heretofore used for the initial freezing of ice cream, heat is absorbed or transferred from the mixture to be frozen by having a chamber holding the mixture surrounded or enclosed by a medium having a temperature considerably below the freezing point of the mixture to be frozen. In such a method, the transfer of the heat from the mixture to the freezing medium is naturally at the points where the mixture contacts with the walls of the container and in order to prevent the accumulation of frozen particles on the wall, to insure all portions of the mixture being brought into contact with the walls, and to insure the frozen particles assuming a finely divided condition, means are provided for continuously removing frozen particles from the walls of the container as it freezes. Generally, this is done by placing revoluble or scraping devices inside of the container, so that blades carried by such devices will scrape or remove frozen portions of the mixture which are in contact with the container walls. In this connection, it is obvious that movement imparted to the mixture by the scraper blades tends to accelerate the rate of heat exchange, thereby reducing the time necessary for freezing the mixture.

In addition to the treatment of the mixture as above outlined, the methods of making ice cream heretofore known in the prior art also consist in beating or agitating the mixture concurrently with the freezing thereof, for the purpose of incorporating the air or gas which has heretofore been mentioned as being necessary to produce proper characteristics in the frozen product. Such beating or agitation of the mixture has been secured in prior art structures by having the frame for the scraping blades also formed with a shaft adapted to be located centrally of the freezing container and provided with blades or paddles which, when said frame and shaft are revolved, act as beaters to beat or whip air or other gases into the product while the mixture is being frozen.

As a result of certain experiments, it has been found that these prior art practices of concurrently beating and freezing the mixture results in the viscosity of the ingredients being altered considerably, and, as a consequence, the resulting ice cream is not as stable as it might be; it is quite sensitive to heat shock, and it is not as capable of retaining the air incorporated therein as is desired, thereby affecting its texture. In view of this, the present invention contemplates a method of producing ice cream wherein the viscosity of the ingredients or constituents of the mixture to be frozen are substantially unaltered so that the resulting products possesses considerably greater stability than present day ice cream; it is less sensitive to heat shock and will retain the air incorporated therein much better than in the case of present day methods. It should be added here that the retention by the ingredients of their natural viscosity stabilizes the mixture, so to speak, so that the operation of drawing off the frozen product from the freezing product will have practically no effect on the air content of the frozen product, a feature or characteristic which is possessed by ice cream produced in accordance with present day practices. Furthermore, in the present method, the drawing off step is performed under such conditions as to not materially affect the air content and other characteristics of the frozen material.

The method contemplated by the present invention may, of course, undoubtedly be practiced with various forms of apparatus. However, one form of apparatus which has been advantageously used is illustrated in the accompanying drawing for the purpose of clearly disclosing the present invention, but it will be understood that other forms of apparatus may be utilized. The apparatus shown and described herein will be made the subject matter of a separate application.

In the accompanying drawing:

The figure is an elevational view, partly in section, showing more or less diagrammatically the apparatus employed in connection with the present invention.

In the particular apparatus illustrated herein, the pedestal 10 supports a suitable jacket 11 through which any desirable freezing medium is adapted to be circulated. Within said jacket 11 there is a container or receptacle 12 within which the mixture constituting the ice cream is to be frozen, the mixture being charged in said receptacle through suitable inlet 13. Extending axially of said container 12 is the shaft 14 which projects a considerable distance beyond one end of the jacket 11, its exterior end being journaled in one or more bearings carried by the pedestal 10. At its exterior end said shaft 14 is provided with means for revolving the same. Such driving means may consist of a motor 15 mounted on a shelf 16, constituting a part of pedestal 10, the shaft of said motor having a pulley 17 thereon connected to a pulley 18 on shaft 14 by an ordinary driving belt 19. Mounted on shaft 14 at spaced points within the freezing container 12 is a plurality of blades 20 which are termed or known as beater blades for agitating the mixture to incorporate air therein.

Journaled on shaft 14, and located partly within and partly without the jacket and container, is a sleeve 21 on whose inner end is mounted a collar 22, provided with four radially disposed arms 23. At their radial outer ends, arms 23 carry blades 24, 24a, extending longitudinally of the container 12, said blades being supported at their opposite end by similar arms 23, which merge into a collar 22a, loose on shaft 14. At its outer end, sleeve 21 is provided with suitable means for revolving said sleeve and the blades 24, 24a, carried thereby. Such means, of course, may take any desirable form, but in the present instance they consist of a motor 25 on whose shaft there is a pulley 26, connected by belt 27 to a pulley 28, said pulley 28 being mounted on a shaft which carries a beveled gear 29 adapted to mesh with a corresponding beveled gear 30 fast on said sleeve 21. It will be obvious that shaft 14, with the beater blades 20, may be rotated by motor 15, or, if desired, the blades 24, 24a, may be revolved by motor 25, either of these operations being capable of being performed independently of the other. In this way, after the receptacle 12 has been charged with an amount of mixture that will allow for overflow, circulation of a freezing medium through jacket 11 is established. Those portions of the mixture in contact will be frozen by the exchange of heat units that will take place between them and the circulating freezing medium. During this freezing operation, motor 25 will function to revolve blades 24, 24a, to prevent the accumulation of frozen particles on the walls of the container. Such movement of blades 24, 24a will also serve for other purposes as before outlined, such as causing the frozen particles assuming a finely divided state and expediting the freezing of the entire body of the mixture. Due to the independent drive for the beater blades 20, the latter will remain substantially stationary, moving only to the extent that they are caused to by the movement of the mixture within the freezing receptacle. In this way, agitation of the mixture and consequent incorporation of air therein while being frozen is held at a minimum, so that the viscosity of the mixture is preserved in a very large measure with the result that when the product is finally finished, it possesses a superior texture and much greater stability than a product produced by a method wherein the mixture is agitated for the incorporation of air simultaneously while it is being frozen. In carrying out this freezing step, the scraping blades are revolved at a speed no faster than is absolutely necessary to produce ice crystals in a finely divided condition, and after the water content is frozen to the extent necessary, the circulation of the freezing medium in the jacket is discontinued. The beaters 20 are then started by placing motor 15 in operation and the whipping effected by such blades is carried on until sufficient air is incorporated in the product. The time at which the proper quantity of air has been incorporated in the frozen mixture may be determined by the apparatus shown and described in my application No. 107,303, dated May 6, 1926. This apparatus which is included in the connections leading from the main line to motor 15 and which determines the quantity of air incorporated in the mixture by the amount of energy required to drive the shaft 14, is shown diagrammatically in the accompanying drawing by M, but a further description thereof is deemed unnecessary, in view of the fact that it is fully disclosed in the application just referred to. In this way, the desirable characteristics, such as superior texture and greater stability, are obtained in the final product by reason of the fact that there is no whipping of the mixture during the freezing operation. So far as the present invention is concerned, the scrapers 24 may remain stationary while beaters 20 are in operation for incorporating air, or, if desired, the scrapers may continue in operation concurrently with the beaters 20. The important point is, the beaters 20 are not to operate in conjunction with the blades 24 during the freezing operation.

After the proper quantity of air has been incorporated in the frozen mixture, the beating device is then stopped and allowed to go free, while the mixture is unloaded from the freezer. This unloading or discharging of the frozen mixture is obtained by means of the blades 24a, being disposed at an angle to the longitudinal center of the container instead of extending parallel thereto as in the case of blades 24. This angular disposition of blades 24a causes the frozen material to be discharged through a suitable opening 31 near the bottom of container 12. It is rather important that the beaters remain substantially stationary during the discharging operation, because after the proper quantity of air has been incorporated, as determined by the attachment M, it is desirable that the mixture be subsequently agitated as little as possible. This results in a product of uniform air content throughout, a result not possible with those forms of apparatus wherein the beaters function during the discharging operation. This is due to the fact that where the beaters continue to operate, the later increments of frozen product removed from the freezer are operated upon by the beaters a greater length of time than those portions of the same batch which are first removed, so that the subsequent portions of the batch which have thus been operated upon by the beaters a greater length of time are certain to have their air content detrimentally acted upon either by having the air content increased or decreased. The fact that such subsequently discharged increments of the same batch are acted upon by the beaters a greater length of time in the prior art structures is sufficient to insure the air content of such subsequent increments being affected one way or the other.

While the present invention has been described in connection with one particular form of apparatus, it is to be understood that the method described and claimed herein is susceptible of being practiced in any form of apparatus wherein the initial freezing operation may take place with a minimum agitation of the mixture; wherein after the water content has been frozen to the desired extent, the mixture may then be agitated for the incorporation of air therein without continuing the freezing operation; and wherein the agitation of the mixture can again be reduced to a minimum while the frozen mixture with the desired percentage of incorporated air is being discharged from the freezing receptacle. In other words, the fundamental point, broadly stated, is to freeze the mixture without affecting the viscosity of its contents; then agitate the frozen mixture to incorporate air; and subsequently remove the frozen mixture without materially effecting the air content thereof.

It will be understood that in the commercial production of ice cream, the water content of the mixture is only partially frozen by the apparatus shown herein, complete freezing of the mixture taking place after the same has been placed in storage under proper temperature conditions. In this connection, it is possible to utilize the present invention by a method wherein the water content of the mixture is not necessarily reduced to a point where it is actually frozen while the brine or freezing medium is circulating through the jacket and the blades are revolving. It is possible to omit actual freezing by simply reducing the temperature to a point just above freezing and obtain an actual freezing of said water content after the aerated mixture has been placed in storage.

What I claim is:

1. The method of preparing ice cream comprising the separately performed steps of reducing the temperature of the mixture to a point where the water content thereof is partially frozen and agitating said mixture to incorporate air therein, the step of incorporating air being substantially and entirely performed subsequently to the other.

2. The method of preparing ice cream, which consists in substantially maintaining the original viscosity of a mixture while reducing the temperature of said mixture to a point where the water content thereof is partially frozen, then incorporating air therein to the desired percentage, and discharging the product from the container, the percentage of air in the frozen mixture being substantially unaltered during the discharge of the product.

3. The method of preparing ice cream, which consists in substantially maintaining the original viscosity of a mixture while reducing the temperature of said mixture to a point where the water content is partially frozen, and subsequently incorporating air to the desired percentage.

4. The method of producing ice cream, which consists in charging a mixture into a freezer, partially freezing the water content thereof, said mixture being only slightly agitated during the freezing thereof, whereby it retains substantially its original viscosity, then agitating the partially frozen product to incorporate air therein, and then subsequently removing the frozen aerated mixture from the freezer, the air content of the mixture remaining substantially unaffected during the removal of the mixture.

5. The method of preparing ice cream, which comprises the steps of reducing the temperature to substantially the freezing point of the water content thereof, the original viscosity of the ingredients of said mixture being substantially maintained during the freezing step, then agitating the mixture to incorporate air therein, and subsequently rendering said agitating means inoperative while the frozen mixture is removed from its container.

6. The method of preparing ice cream, which consists in charging a mixture into a container, circulating a freezing medium around the exterior of said container, removing frozen particles from the wall of said container during the freezing operation, said steps being performed in the absence of any beating or agitating of the mixture, then agitating said mixture to incorporate air therein, then rendering the agitating means inoperative, and finally, while said agitating means are inoperative, removing the frozen product from the container with the aid of the means employed for removing the frozen particles from the container walls during the freezing step, whereby the air content of the frozen product remains substantially unaffected during removal from the container.

7. The method of manufacturing frozen food products having a gas such as air incorporated therein, which consists in freezing all of the ingredients constituting said product other than the said gas in the presence of a fixed quantity of gas less than the quantity desired in the finished product and subsequently adding to the frozen constituents a determinable quantity of gas.

GROVER D. TURNBOW.